United States Patent [19]

Buonomo et al.

[11] Patent Number: 4,972,317
[45] Date of Patent: Nov. 20, 1990

[54] MICROPROCESSOR IMPLEMENTED DATA PROCESSING SYSTEM CAPABLE OF EMULATING EXECUTION OF SPECIAL INSTRUCTIONS NOT WITHIN THE ESTABLISHED MICROPROCESSOR INSTRUCTION SET BY SWITCHING ACCESS FROM A MAIN STORE PORTION OF A MEMORY

[75] Inventors: Joseph P. Buonomo, Endicott; Robert W. Callahan, Endwell; Steven R. Houghtalen, Endicott; Sivarama K. Kodukula, Binghamton; Raymond E. Losinger, Endicott, all of N.Y.; Brion N. Shimamoto, Greenwich, Conn.; Harry L. Tredennick, San Jose, Calif.; James W. Valashinas, Endicott, N.Y.

[73] Assignee: International Business Machines Corp., Armonk, N.Y.

[21] Appl. No.: 390,454

[22] Filed: Aug. 4, 1989

Related U.S. Application Data

[63] Continuation of Ser. No. 915,823, Oct. 6, 1986, abandoned.

[51] Int. Cl.[5] ............................................. G06F 15/00
[52] U.S. Cl. ................... 364/200; 364/254.8; 364/261; 364/263.2; 364/232.3
[58] Field of Search ... 364/200 MS File, 900 MS File

[56] References Cited

U.S. PATENT DOCUMENTS

| 3,292,155 | 11/1966 | Neilson | 364/200 |
|---|---|---|---|
| 3,315,235 | 4/1967 | Carnevale et al. | 364/200 |
| 3,374,466 | 3/1968 | Hanf et al. | 364/200 |
| 3,614,740 | 10/1971 | Delagi et al. | 364/200 |
| 3,646,522 | 2/1972 | Furman et al. | 364/200 |
| 3,735,363 | 5/1973 | Beers et al. | 364/200 |
| 3,735,364 | 5/1973 | Hatta et al. | 364/200 |
| 3,766,532 | 10/1973 | Liebel, Jr. | 364/200 |
| 3,891,974 | 6/1975 | Coulter et al. | 364/200 |
| 4,077,058 | 2/1978 | Appell et al. | 364/200 |
| 4,153,933 | 5/1979 | Blume et al. | 364/200 |
| 4,205,371 | 5/1980 | Feather | 364/200 |
| 4,330,823 | 5/1982 | Retter | 364/200 |
| 4,354,225 | 10/1982 | Frieder et al. | 364/200 |
| 4,370,709 | 1/1983 | Fosdick | 364/200 |
| 4,409,654 | 10/1983 | Wada et al. | 364/200 |
| 4,434,459 | 2/1984 | Holland et al. | 364/200 |
| 4,443,865 | 4/1984 | Schultz et al. | 364/900 |
| 4,591,982 | 5/1986 | Buonoma et al. | 364/200 |
| 4,727,480 | 2/1988 | Albright et al. | 364/200 |
| 4,839,797 | 6/1989 | Katori et al. | 364/200 |

Primary Examiner—Thomas C. Lee
Attorney, Agent, or Firm—Richard E. Bee

[57] ABSTRACT

A microprocessor chip which is capable of executing a specific subset of instructions on behalf of the main storage portion of a computer memory can be made to emulate direct execution instructions not in that specific subset while working on behalf a control storage portion of the computer memory in a manner which is transparent to the main storage portion by means of a novel set of operand space selection instructions in the control storage portion and a novel switching circuit on the microprocessor chip which controls the access of the chip to the control store portion and the main store portion.

8 Claims, 2 Drawing Sheets

MICROPROCESSOR IMPLEMENTED DATA PROCESSING SYSTEM CAPABLE OF EMULATING EXECUTION OF SPECIAL INSTRUCTIONS NOT WITHIN THE ESTABLISHED MICROPROCESSOR INSTRUCTION SET BY SWITCHING ACCESS FROM A MAIN STORE PORTION OF A MEMORY

This is a continuation of co-pending application Ser. No. 06/915,823 filed on Oct. 6, 1986 now abandoned.

FIELD OF THE INVENTION

This invention relates generally to data processing systems, and more particularly to systems for emulating the execution of instructions.

BACKGROUND OF THE INVENTION

Systems which use microprocessor chips to execute instructions received from a memory are already well known. In such systems, the memory and a microprocessor chip are normally connected by printed circuits which facilitate the flow of instructions and data from the memory to the chip and the flow of processed data back to the memory.

Peripheral computer components such as disks, keyboards and monitors are normally also connected to the system in order to load and initiate the execution of instructions and to store and to monitor the results of such execution.

Instructions and data are usually read into main memory from a disk so that they may be executed in a programmed sequence. That is to say, the memory will provide the microprocessor with instructions to be executed and the data to be processed. The microprocessor processes the data as instructed by the instructions in the main memory instruction by instruction until the end of the programmed sequence is reached.

It has been a major effort throughout the computer industry to provide smaller and smaller computers which are capable of performing the same functions as large main frame computers. Large main frame computers are provided with central processing units for executing all of the set of instructions in the memory. Smaller computers, i.e. "micro-computers," use microprocessor chips instead of central processing units. However, it has not been technically possible and economically feasible to build a microprocessor chip which will execute all of the set of instructions normally found in the memory of large main frame computers.

However, it is possible to build a microprocessor chip capable of executing only a specific subset of the set of instructions in the memory. One useful method of virtually increasing the subset of instructions the microprocessor chip is capable of executing so that it is co-extensive with the set of instructions in the memory is the use of a co-microprocessor chip working in combination with a control storage portion of the memory.

Whenever the microprocessor chip is directed to execute a main frame instruction which is not a part of the specific subset of instructions it performs, the microprocessor chip turns itself off and turns on the co-microprocessor chip. The co-microprocessor chip has its own instructions in the control storage to emulate the execution of the main frame instruction. The co-microprocessor chip and the control storage work in such a way that the activity of the co-microprocessor chip is transparent to the program in the main storage portion of the memory.

For example, if the main frame instruction which is not a part of the specific subset is an invalid instruction, it will be recognized as such by the microprocessor. The co-microprocessor will be activated by the microprocessor and will execute its own program from control storage. This program in control storage can instruct the co-microprocessor chip to read the main frame instruction from main storage. Next the co-microprocessor compares the instruction in question with the set of main frame instructions that it emulates. The results of the comparison will show that the main frame instruction is invalid. The co-microprocessor will then emulate the action that would happen on a main frame computer when an invalid instruction is encountered. The co-microprocessor then returns control to the microprocessor which in turn continues processing main frame instructions. The above emulated action normally causes the main frame to invoke an instruction sequence that usually results in an error message being displayed on a monitor.

If the instruction which is not a part of the specific subset of instructions is a valid instruction from the set of instructions, it will be emulated by the co-microprocessor. That is, the co-microprocessor will compare the instruction with the set of instructions, as described above, to determine that it is a valid main frame instruction. The co-microprocessor chip then reads the data to be operated on from the main storage and processes it according to the main frame instructions architecture, after which the results of the operation will be written into main storage. Again, the co-microprocessor returns control to the microprocessor which in turn continues processing the next main frame instruction.

The small co-microprocessor chip system has worked well in enabling the emulation of larger main frame computers. However, the need to make even smaller, faster, more reliable systems which consume less power and require less cooling while still being capable of executing the full set of instructions of a main frame computer has highlighted the co-microprocessor system as an area where even further improvements are desirable.

The co-microprocessor chip takes up space on a printed circuit board in the computer, it requires power and produces heat, all of which are not desirable attributes. Further, the fact that the co-microprocessor chip is executing instructions from control storage while working on data from main storage means that it must issue read/write steering cycles much more often than the microprocessor chip which is working with instructions and data both in the same storage. Although each cycle requires only a short time, the great number of such additional cycles required for such co-microprocessing result in perceptibly slower execution of instructions in a computer.

In prior art data processing systems using co-microprocessors, the microcode instructions in the control storage for use in emulation often must be written in a different language than the directly executed instructions in the main storage. The development of improved co-microprocessors often means that new microcode instructions must be written for the control storage emulation programs at considerable expense and effort. It would be desirable to produce a data processing system with directly executed instructions in main storage and microcode instructions in control storage memories having the same language.

SUMMARY OF THE INVENTION

It is an object of the present invention to overcome these and other disadvantages of the prior art.

It is also an object of the present invention to improve the processing speed of computers.

It is also an object of the present invention to reduce the cost of computers.

It is a further object of the present invention to reduce the number of microprocessor chips required by a computer to execute a set of instructions.

It is still another object of the present invention to reduce the power consumption of computers.

It is yet another object of the present invention to reduce the heat output and the corresponding cooling requirements of computers.

It is an additional object of the present invention to produce a data processing system for use in microprocessors wherein directly executed instructions in the main storage and microcode instructions in the control storage are in the same language.

These and other objects are accomplished by a data processing system for executing a set of instructions, which system comprises:

(a) a microprocessor chip capable of directly executing a specific subset of said set of instructions; and (b) a memory communicating with (a) including a main storage portion and a control storage portion;

wherein said main storage portion of said memory contains said set of instructions;

wherein said control storage portion contains a control set of instructions which can be directly executed by (a) to emulate execution of instructions not in said specific subset of instructions;

wherein (a) includes a switching circuit which maintains (a) in operation on behalf of said main storage portion of said memory during execution of instructions in said specific subset of instructions and which places (a) in operation on behalf of said control storage portion of said memory whenever said main storage portion instructs (a) to execute an instruction which is not in said specific subset of instructions; and wherein said control storage portion of said memory also includes a set of operand space selection instructions which operate said switching circuit whenever (a) is operating on behalf of said control storage portion so that (a) can access both said main storage portion and said control storage portion of said memory.

BRIEF DESCRIPTION OF THE DRAWINGS

The invention is described below with reference to the drawings which are intended to be illustrative of the invention but not exhaustive of all possible embodiments of the invention.

DETAILED DESCRIPTION

It has been discovered that a microprocessor chip which is capable of executing a specific subset of instructions on behalf of the main storage portion of a computer memory can be made to emulate direct execution instructions not in that specific subset while working on behalf a control storage portion of the computer memory in a manner which is transparent to the main storage portion by means of a novel set of operand space selection instructions in the control storage portion and a novel switching circuit on the microprocessor chip which controls the access of the chip to the control store portion and the main store portion.

Figure 1:
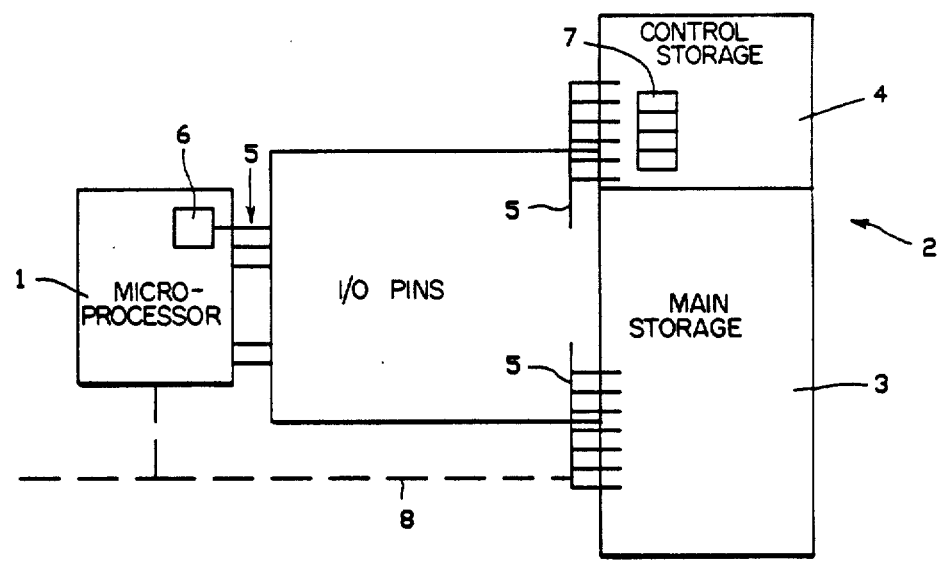
FIG. 1 schematically portrays the relationship of the microprocessor and the memory.

FIG. 1 shows computer memory 2 which is made up of main storage portion 3 and control storage portion 4. Each of main storage portion 3 and control storage portion 4 communicate separately with chip 1 through multiple Input/Output (I/O) pins 5.

Switching circuit 6 controls the access of chip 1 either to control store 4 or to main store 3. The term "access", as used herein, is intended to mean both reading and writing functions, as will be readily understood by those conversant with the computer arts.

Control storage portion 4 can include the entire subset of instructions directly executed and a set of new operand space selection instructions, schematically represented as 7 which control switching circuit 6. Operand space selection instructions 7 control the access of microprocessor chip 1 to data in both control storage portion 4 and main storage portion 3.

In the embodiment of the invention illustrated in FIG. 1, operand space selection instructions 7 are (i) set read control storage, write control storage; (ii) set read main storage, write control storage; (iii) set read main storage, write main storage; (iv) set read control storage, write main storage; and (v) return to execution on behalf of main storage portion.

It will be readily apparent to those of ordinarily familiarity with computers that the data processing system which contains the present invention will have other components, such as terminals, monitors, disks or parallel processors which would be connected to microprocessor chip 1 or storage 2 through busses or printed circuits generally represented by dotted line 8. The illustration of such other components of a data processing system is not necessary to the understanding of the present invention.

The language of the microcode instructions in control storage 4 is the same as that of the directly executed instructions in main storage 3. An important inherent advantage of having both the microcode and the directly executed instructions in the same language is that improved microprocessors which directly execute instructions in main storage can be substituted for the original microprocessor without the need to rewrite the microcode instructions in the control language.

Figure 2:
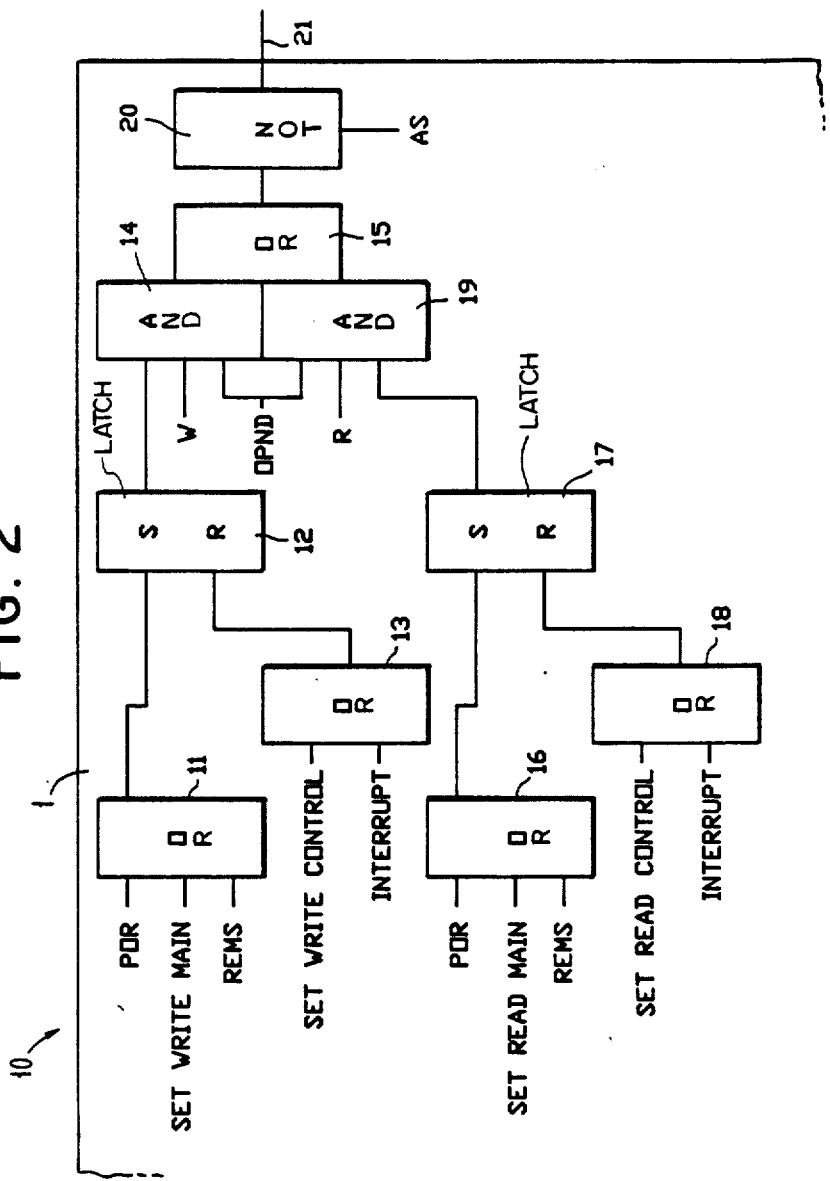
FIG. 2 shows schematically the logic of the switching circuit.

FIG. 2 shows, schematically, the logic by which switching circuit 6 of FIG. 1 determines the access of microprocessor chip 1 alternatively to main storage portion 3 or to control storage portion 4 responsive to operand space selection instructions 7.

Circuit 10 is a positive logic arrangement of "or" gates, "and" gates, latches and a final inverter.

Or gate 11 will send a positive signal to latch 12 as a result of a power on condition (POR) or a "set write main storage" instruction from control storage 4 or a "set return to execution on behalf of main storage" instruction from control storage 4 (REMS in FIG. 2).

Or gate 13 will send a positive signal to latch 12 if it receives a "set write control" or a "set return to execution on behalf of main storage" instruction from control storage 4.

Whenever latch 12 receives a positive signal from or gate 11, it sends a positive signal to and gate 14. However, if latch 12 receives a positive signal from or gate 13, it sends a negative signal to and gate 14.

And switch 14 sends a positive signal to or gate 15 if it receives a positive signal from latch 12 and a positive signal indicating that a write function is to be accomplished and a positive signal indicating that a data operand is being written.

Or switch 16 sends a positive signal to latch 17 in the event of a POR condition or upon receipt of a set read main storage instruction from control storage 4 or in the event of a "set return to execution on behalf of main storage" instruction from control storage 4.

Or switch 18 sends a positive signal to latch 17 upon receipt of a "set read control" instruction or upon receipt of a "set return to operation on behalf of main storage" from control storage 4.

Whenever latch 17 receives a positive signal from or gate 16, it sends a positive signal to and gate 19. However, if latch 17 receives a positive signal from or gate 18, it sends a negative signal to and gate 19.

And switch 19 will send a positive signal to or gate 15 if it receives a positive signal from latch 17 and a positive signal indicating that a read function is to be accomplished and a positive signal indicating that a data operand is being read, as opposed to an instruction read.

Inverter 20 will be enabled upon receipt of an address strobe (AS) from other microprocessor circuitry to set address pin 21 in either a positive or negative condition. When set in a negative condition, access of microprocessor chip 1 is to main storage portion 3 of memory 2. A positive condition of address pin 21 will cause microprocessor chip 1 to access control storage 4.

In operation pin 21 is set in a negative condition when the data processing system is powered on so that microprocessor chip 1 operates on behalf of main storage portion 3 of memory 2. When the power on condition occurs, both or gate 11 and or gate 16 send positive signals to latch 12 and to latch 17.

Latches 12 and 17 send positive signals to and gates 14 and 19. As and gates 14 and 19 receive either a write condition or a read condition for operands, a positive signal is passed by and gates 14 or 19 through or gate 15 to inverter 20. Inverter 20 inverts the positive signal to a negative condition for pin 21 whenever it is enabled by an address strobe. In this condition microprocessor chip 1 will access main storage portion 3 in connection with all instruction operand access.

In such a condition, microprocessor chip 1 will directly execute instructions on behalf of main storage portion 3. However microprocessor chip 1 is only able to directly execute a specific subset of the instructions which main storage portion 3 is capable of issuing. As discussed above, there have been economic and technical difficulties in making a microprocessor chip which will directly execute the entire set of instructions normally issued by a main frame computer.

Whenever chip 1 is instructed by main storage portion 3 to execute an instruction which is not a part of the specific subset of instructions which chip 1 can directly execute, it sends a signal called "interrupt action" to or gates 13 and 18 in switching circuit 10. Both or gates 13 and 18 send positive signals to latches 12 and 17, which causes the outputs of latches 12 and 17 to send negative signals to and gates 14 and 19. Both and gates 14 and 19 send negative signals to or gate 15.

Or gate 15 sends a negative signal to inverter 20. When enabled by an address strobe, inverter 20 sends a positive signal to pin 21 so that microprocessor chip 1 is operating within control storage portion 4 of memory 2 when the interrupt action takes place.

A program in control storage 4 which is intended to respond to the interrupt action from microprocessor 1, then can use all of the subset instructions it performs directly in addition to the operand space selection instructions to direct the microprocessor to fetch instruction operands from main storage 3. The program in control storage 4 will call the instruction "set read main storage, write control storage." This causes microprocessor chip 1 to access the instruction from main store as data which was not directly executed and which caused microprocessor chip 1 to issue interrupt action.

In the case of a truly invalid instruction as previously discussed, that is, which is not a member of the set of main frame instructions contained in main store 3, the program in control store recognizes the invalidity of the instruction and issues the new "set read control storage, write main storage" instruction. The interrupt action information can now be efficiently moved from control storage 4 to main storage 3. This allowed the control storage program to transparently intercept the interrupt action and decide if emulation was required.

The "interrupt action" move after the above "set read control storage, write main storage" instruction has issued as it relates to switching circuit 10, is as follows (the move consists of the appropriate number of read(s) followed by write(s)): Or gate 18 sends a positive signal to latch 17 which resets latch 17 and sends a negative signal to and gate 19. And gate 19 sends a negative signal to or gate 15. And gate 14 also sends a negative signal to or gate 15 because the write line is negative during a read cycle. Or gate 15 sends a negative signal to inverter 20, which then sets pin 21 in a positive condition in response to an enabling address strobe so that microprocessor 1 reads control storage 4.

After the read portion of the move instruction issued from control storage 4 is completed, switching circuit 10 sees the write signal from the write portion of the move instruction. Or gate 11 to sends a positive signal to latch 12 because the "set read control storage, write main storage" instruction was issued from control storage 4 previous to the move. A positive signal is sent by latch 12 to and gate 14 which also receives positive signals because the cycle is a write instruction and because it is an operand. And gate 14 sends a positive signal to or gate 15. Or gate 15 sends a positive signal to inverter 20. Inverter 20 places pin 21 in a negative condition so that the information written by microprocessor 1 as a part of the move instruction from control storage 4 is written is main storage 3.

The program in control storage 4 then issues the new "set return to operation on behalf of main storage" instruction which causes microprocessor chip 1 to again to operate on behalf of main storage 3. When the instruction "set return to operation on behalf of main storage" is issued by control storage 4, both or gates 11 and 16 send positive signals to latches 12 and 17. Latches 12 and 17 transmit positive signals to and gates 14 and 19 when writing or reading operands, respectively. Or gate 15 in turn sends a positive signal to inverter 20 which conditions pin 21 to write and read in main storage again.

In another example, when main storage 3, during the execution of a main frame program, issues to microprocessor 1 the instruction "move to secondary", which will require emulation, microprocessor chip 1 will recognize this instruction as one which is not directly executed. The microprocessor will again send the interrupt action signal as described above which again will cause the program in control storage 4 to be invoked. The control storage program again issues the operand space selection instruction "set read main storage, write control storage," as is also described above in order to get the questionable instruction from main storage 3 into control storage 4 so that its validity can be determined.

In this case the program in control storage 4 will recognize the "move to secondary" instruction as a valid main frame instruction which is not directly executed by microprocessor chip 1. The control storage program can then emulate the "move to secondary" instruction in a manner which is transparent to the main storage program. In other words microprocessor chip 1 will emulate direct execution of the instruction, making use of switching circuit 10 and some of the new operand space selection instructions.

The emulation program in control storage 4 is designed to move information from one location in main storage 3 to another. After building the appropriate operand address of the main frame "move to secondary" instruction, the emulation program will issue the operand space selection instruction "set read main storage, write main storage" followed again by a move instruction. This time, though, the read(s) of the move will be directed to main storage. The write(s), again, will be to main storage. In response to the read portion of the move instruction, or gate 16 will send a positive signal to latch 17 which, in turn, sends a positive signal to and gate 19. And gate 19 sees a positive signal from latch 17, a positive signal because it is a read cycle of the move, and a positive signal because it is an operand access. And gate 19 sends a positive signal to or gate 15 which sends a positive signal to inverter 20. In response to an address strobe, inverter 20 sends a negative signal to pin 21 thereby reading data from main store 3 move from address.

In response to the write portion of the move and because the new "set read main storage, write main storage" instruction was previously issued, or gate 11 sends a positive signal to latch 12 which, in turn, sends a positive signal to and gate 14. And gate 14 sees the positive signal from latch 12, a positive signal on write because the write cycle portion of the move is being performed and a positive signal because it is an operand access. And gate 14 sends a positive signal to or gate 15. Or gate 15 sends a positive signal to inverter 20 which, in response to an enabling address strobe, maintains pin 21 in a negative condition so that the move takes place in main storage 3 at the move to address.

The control program in control store 4 then issues the new "return to operation on behalf of main storage" instruction, returning the operation of microprocessor chip 1 to main storage 3 as described above. The instruction "move to secondary", which microprocessor chip 1 does not directly execute, has been directly executed by chip 1 working on behalf of control store 4 and using switching circuit 10 with operand space selection instructions in control store 4 so that virtual direct execution of the "move to secondary" instruction has been accomplished in a manner that is transparent to main store 3.

In still another example of the operation of the invention, a program sequence in main store 3 instructs microprocessor chip 1 to execute "decimal divide". "Decimal divide" is an instruction which is not in the specific set of instructions which chip 1 executes directly.

As described above, the microprocessor will invoke the control storage program again and this time the decimal divide emulation routine will be executed. In other words microprocessor chip 1 will emulate direct execution of the instruction, making use of switching circuit 10 and some of the operand space selection instructions in control store 4.

First, the emulation control storage program will read the divisor and the dividend from main storage 3 by issuing operand space selection instruction "set read main storage, write control storage", followed by a move instruction. When switching circuit 10 sees the new "read main storage, write control storage" instruction, or gate 16 will send a positive signal to latch 17 which will, in turn, send a positive signal to and gate 19. And gate 19 will then receive positive signals on the read and operand line during the read cycle of the above move instruction. Or gate 15 will then pass a positive signal to inverter 20 which will set pin 21 in a negative state responsive to an enabling address strobe so that microprocessor chip 1 reads the divisor and dividend from main storage 3.

Then, again because of the above issued new set of "read main storage, write control storage" operand space selection instruction, or gate 13 sends a positive signal to latch 12 which, in turn, causes a negative signal to and gate 14. And gate 14 outputs a positive signal indicating that operand in addition to the negative signal from latch 12. And gate 14 sends a negative signal to or gate 15 because and gate 14 is not made. Or gate 15 sends a negative signal to inverter 20 during the write cycle portion of the above move instruction. Inverter 20 sends a positive signal so that the divisor and dividend are written to control storage 4.

The program in control store 4 then issues a the new operand space selection instruction "set read control storage, write control storage" so that it can re-read the divisor and dividend, if required, and accomplishes the division using microprocessor chip 1. The control store program then issues operand space selection instruction "read control storage, write main storage" to move the answer back to main storage.

Thereafter the program in control storage 4 issues the new "return to operation on behalf of main storage: instruction, previously described, returns the operation of microprocessor chip 1 to main storage 3. Direct execution of a decimal divide instruction on behalf of main storage has thus been emulated by chip 1 working directly on behalf of control storage 4 and making use of switching circuit 10 and operand space selection instructions 7 without the use of a co-microprocessor chip and avoiding the need for the additional space, power and cooling which would have been required by a co-microprocessor chip.

In summary, pin 21 is again back in default condition, and microprocessor 1 is executing instructions on behalf of main storage 3. The control storage program used to determine whether the main frame instruction is an invalid instruction or an instruction requiring emulation, and that emulation all occurring in control storage 4, transparent to main storage 3, using only one microprocessor.

Persons of ordinary skill in the computer component technology will be familiar with a variety of useful methods, which are already well known, for implementing the installation of the operand space selection instructions in a control storage, for construction a circuit which operates according to FIG. 2, and the like. Such methods of implementing a particular embodiment of the invention are not a part of the invention, and any useful such method can be used.

The present invention has been disclosed in the above teachings and in the accompanying drawings with sufficient clarity and conciseness to enable one skilled in the art to make and to use the invention, to know the best mode for carrying out the invention and to distinguish it from other inventions and from what is old. Many variations and obvious adaptations of the invention will readily come to mind and these are intended to be contained within the scope of the invention as claimed below.

What is claimed is:

1. A data processing system for executing a user program having first and second types of program instructions, both types of which are members of the same master instruction set, comprising:

main storage means for storing a user program having program instructions of both the first and second type interspersed in such program;

processor means coupled to the main storage means for executing program instructions;

control storage means coupled to the processor means and having stored therein normal control instructions for enabling the processor means to directly execute program instructions of the first type;

said control storage means also having stored therein special control instructions for enabling the processor means to transfer program instructions and operands from the main storage means to the control storage means, for enabling the processor means to access the control storage means and manipulate the program instructions and operands transferred to the control storage means and for enabling the processor means to transfer the results of the manipulations from the control storage means back to the main storage means;

said control storage means further having stored therein at least one interrupt handling control instruction for causing execution of at least one of the special control instructions when the processor means encounters a program instruction of the second type during the execution of the user program;

and switching means responsive to the execution of the special control instructions for enabling the processor means to access either the main storage means or the control storage means as called for by the special control instructions.

2. A data processing system in accordance with claim 1 wherein the special control instructions include oper- and space selection instructions.

3. A data processing system in accordance with claim 1 wherein one of the special control instructions is a Read Control Storage/Write Control Storage instruction for causing the processor means to read data from the control storage means and thereafter write data into the control storage means.

4. A data processing system in accordance with claim 1 wherein one of the special control instructions is a Read Main Storage/Write Control Storage instruction for causing the processor means to read data from the main storage means and thereafter write data into the control storage means.

5. A data processing system in accordance with claim 1 wherein one of the special control instructions is a Read Main Storage/Write Main Storage instruction for causing the processor means to read data from the main storage means and thereafter write data into the main storage means.

6. A data processing system in accordance with claim 1 wherein one of the special control instructions is a Read Control Storage/Write Main Storage instruction for causing the processor means to read data from the control storage means and thereafter write data into the main storage means.

7. A data processing system in accordance with claim 1 wherein the at least one interrupt handling control instruction causes the processor means to execute in a sequential manner a plurality of the special control instructions residing in the control storage means when the processor means encounters a program instruction of the second type during the execution of the user program in the main storage means.

8. A data processing system in accordance with claim 7 wherein the last of the plurality of special control instructions is a Return Execution To Main Storage instruction for causing the processor means to return to the execution of the user program in the main storage means.

* * * * *